US008770982B2

(12) United States Patent
Lee et al.

(10) Patent No.: US 8,770,982 B2
(45) Date of Patent: Jul. 8, 2014

(54) SYSTEM AND METHOD THAT PROVIDE A SELF-CONTAINED DEMONSTRATION

(75) Inventors: Patrick R. Lee, Bolingbrook, IL (US); Bruce A. Defrang, Batavia, IL (US); Darrell J. Kooy, Aurora, IL (US)

(73) Assignee: CA, Inc., Islandia, NY (US)

( * ) Notice: Subject to any disclaimer, the term of this patent is extended or adjusted under 35 U.S.C. 154(b) by 1608 days.

(21) Appl. No.: 11/608,543

(22) Filed: Dec. 8, 2006

(65) Prior Publication Data

US 2008/0138775 A1    Jun. 12, 2008

(51) Int. Cl.
G09B 19/00    (2006.01)
G06F 15/16    (2006.01)

(52) U.S. Cl.
USPC .......................................... 434/118; 709/203

(58) Field of Classification Search
USPC .................. 434/118, 322, 350; 715/747, 744; 709/203
See application file for complete search history.

(56) References Cited

U.S. PATENT DOCUMENTS

| | | | | |
|---|---|---|---|---|
| 6,014,134 A | * | 1/2000 | Bell et al. ....................... | 715/705 |
| 6,101,534 A | * | 8/2000 | Rothschild ..................... | 709/217 |
| 6,149,441 A | * | 11/2000 | Pellegrino et al. ............. | 434/350 |
| 6,347,333 B2 | * | 2/2002 | Eisendrath et al. ............ | 709/217 |
| 6,370,355 B1 | * | 4/2002 | Ceretta et al. .................. | 434/350 |
| 6,371,765 B1 | * | 4/2002 | Wall et al. ...................... | 434/224 |
| 6,514,085 B2 | * | 2/2003 | Slattery et al. ................. | 434/335 |
| 7,331,018 B2 | * | 2/2008 | Lee et al. ........................ | 715/747 |
| 7,461,049 B2 | * | 12/2008 | Thompson et al. ................... | 1/1 |
| 2005/0119906 A1 | * | 6/2005 | Lee et al. ............................ | 705/1 |
| 2005/0125375 A1 | * | 6/2005 | Lee et al. ........................... | 707/1 |

* cited by examiner

*Primary Examiner* — Xuan Thai
*Assistant Examiner* — Michael Grant
(74) *Attorney, Agent, or Firm* — Pillsbury Winthrop Shaw Pittman LLP

(57) ABSTRACT

A self-contained demonstration that demonstrates the functionality of an application module. More specifically, the functionality of the application module with respect to information within an external information source that is located remotely from the application module may be demonstrated. In some instances, the components of a system providing the self-contained demonstration may be installed and executed on a single device, while the external information source would be located remotely and externally from the single device. In order to demonstrate the functionality of the application module, the self-contained demonstration may enable the application module to interact with a local information source in substantially the same manner as the application module would interact with an external information source. The local information source may be installed locally on the single device, and may be a scaled-down version of an external information source.

20 Claims, 2 Drawing Sheets

SYSTEM AND METHOD THAT PROVIDE A SELF-CONTAINED DEMONSTRATION

FIELD OF THE INVENTION

The invention relates generally to the demonstration of applications that enable a user to interact with an external information source, and more particularly, to a self-contained demonstration of an application that enables a user to interact with an external information source.

BACKGROUND OF THE INVENTION

Software applications that enable a user to interact with an external information source that is located remotely from the user are known. The external information source may include, for example, data stores associated with one or more databases. As another example, information within the external information source may include information generated by one or more applications being executed remotely from the user. The software applications that enable this interaction typically receive requests from the user and generate requests to the external information source. In addition, the software applications may receive responses from the external information source to the requests generated by the software applications, and the software applications may convey these responses to the user.

Typically, demonstrations of the interaction between these conventional applications and an external information source may require an actual connection with the external information source. This may prove unmanageable in some instances, as a connection with an external information source may not be convenient. Further, providing access to an external information source via the conventional application for the purposes of a demonstration may alter the information within the information source. This may compromise the integrity of the external information source, require the external information source to be restored (which may be a relatively time and/or resource consuming process), and/or be associated with other drawbacks.

As an alternative, a demonstration application may be written that provides a demonstration illustrating some of the functionality of the actual application with respect to an external information source. However, the demonstration application may not really be manipulating and/or accessing information, but instead may simply be programmed to complete a series of predetermined operations. Thus, a user may not be able to deviate from the "script" of the predetermined demonstration. This may prevent the user from observing the complete set of functionality provided by the actual application. Further, the use of a demonstration application may require an entirely separate application (e.g., the demonstration application) to be written in order to provide the demonstration. Under this paradigm, any changes made to the software application must then be propagated into the separate demonstration application in order to provide a demonstration of the software application.

These and other drawbacks associated with the demonstration of applications that enable a user to interact with an external information source exist.

SUMMARY

One aspect of the invention may relates to providing a self-contained demonstration that demonstrates the functionality of an application module. More specifically, the functionality of the application module with respect to information within an external information source that is located remotely from the application module may be demonstrated. In some instances, the components of a system providing the self-contained demonstration may be installed and executed on a single device, while the external information source would be located remotely and externally from the single device. In order to demonstrate the functionality of the application module, the self-contained demonstration may enable the application module to interact with a local information source in substantially the same manner as the application module would interact with an external information source. The local information source may be installed locally on the single device, and may be a scaled-down version of an external information source.

By enabling the application module to interact with the local information source, a demonstration of the functionality of the application module may be provided that does not require (1) an available external information source, (2) a connection between the single device and the available external information source, and/or (3) a separate demonstration application that demonstrates some of the functionality of the application module. This may enable a relatively full function demonstration that permits the user to implement the functionality of the application module without regard for a predetermined script (e.g., as is required in the user of a separate demonstration application). The self-contained demonstration may enable demonstration of the application module without the cost in time and/or resources of providing an external information source (and/or a connection thereto), or maintaining the external information source subsequent to the demonstration. Further, since the actual application module may be implemented in the self-contained demonstration, changes made to the application module during development may not need to be propagated to the self-contained demonstration since they will already be present in the revised version of the actual application module.

In some embodiments, the self-contained demonstration may be installed on a single device, and may include an application module, an interface module, and a local information source. The application module may be configured to (1) receive requests input by a user to access and/or manipulate information within an external information source, (2) generate requests for the external information source that request the external information source provide access to and/or manipulate the information within the external information source in accordance with the requests input by the user, and (3) convey, to the user, responses of the external information source to the requests generated by the application module. The local information source may be located locally on the single device, and may be a scaled down version of the external information source such that the organization and/or the type of information provided by the local information source may be similar to the organization and/or the type of information provided by the external information source and the information provided by the local information source may be limited relative to the information provided by the external information source. The interface module may be configured to format requests generated by the application module and responses of the local information source to the requests such that the application module and the local information source are enabled to interact in substantially the same manner as the application module would interact with the external information source, thereby providing the user with a self-contained demonstration of the operation of the application module.

In some embodiments of the invention, the information within the local information source may be limited with respect to the information within the external information source in terms of quantity, complexity, detail, organization, sophistication, and/or otherwise limited. For example, in instances in which the external information source includes one or more databases, the internal information source may include a spreadsheet. The organization and/or the type of the information provided by the spreadsheet may mimic the organization and/or the type of the information provided by the one or more databases.

According to various embodiments of the invention, the local information source may be reset to its state prior to the initiation of the self-contained demonstration. This may include restoring an original set of information within the local information source, restoring an application associated with the local information source to its initial state and/or configuration, and/or other actions to reset the local information source. The limited nature of the information within the local information source, with respect to the information included in an external information source, may facilitate the reset of the local information source.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
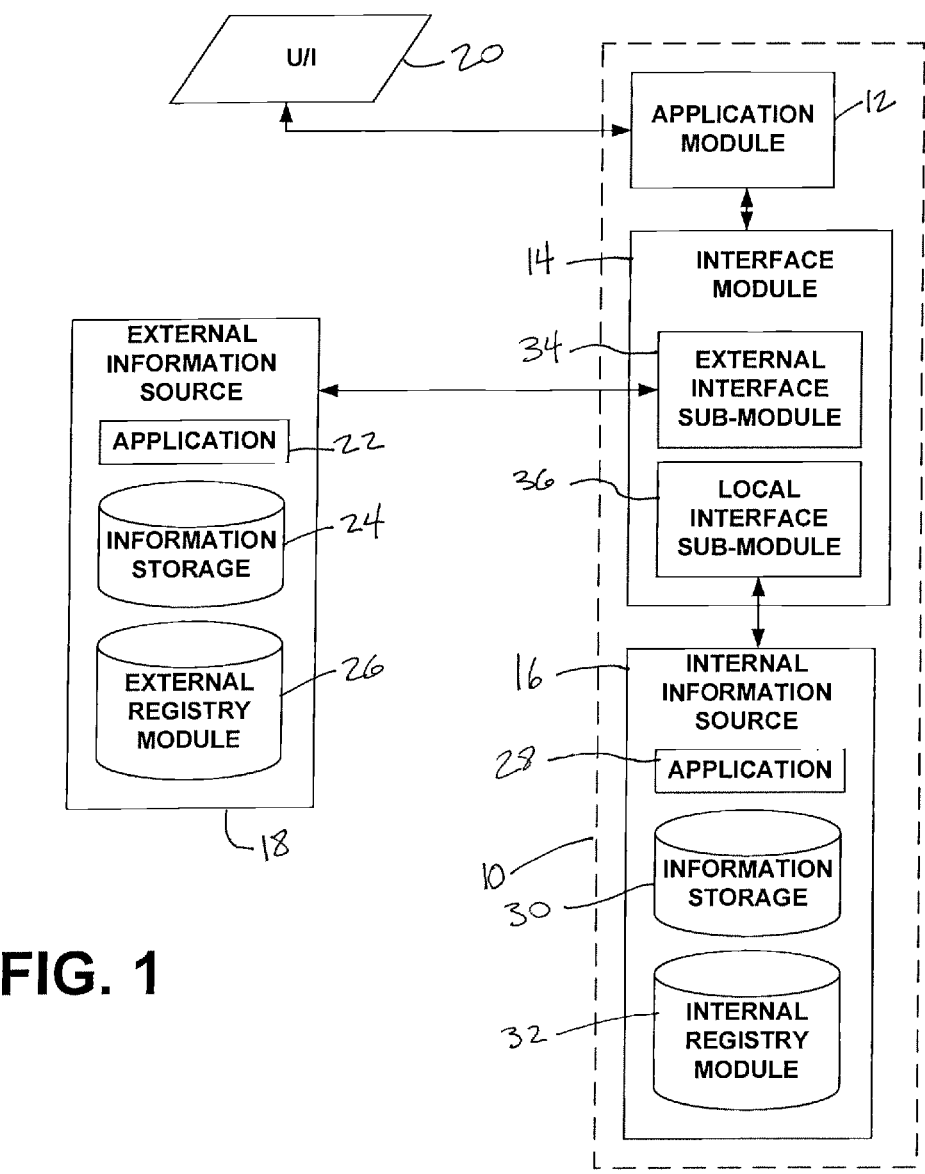
FIG. 1 illustrates a self-contained demonstration system, according to one or more embodiments of the invention.

FIG. 1 illustrates a self-contained demonstration system 10, according to one or more embodiments of the invention. System 10 may include an application module 12, an interface module 14, a local information source 16, and/or other components. In some implementations, application module 12 may provide an interface to a user to enable the user to access and/or manipulate information within an external information source 18. In order to provide a demonstration of the functionality provided by application module 12 with respect to information within external information source 18, system 10 may enable similar functionality to be provided by application module 12 with respect to local information source 16. Thus, system 10 may enable a demonstration of application module 12 without requiring communication with an external entity, such as information source 18.

According to various embodiments, the components of system 10 (e.g., application module 12, interface module 14, local information source 16, etc.) may be provided within a single device to provide a self-contained demonstration of application module 12. As used herein, a single device is intended to include a solitary personal computing station (e.g., a desktop computer, a laptop computer, a handheld computer, etc.). It should be appreciated that as such, the single device may include a plurality of processing units (e.g., in a multiple processor device), and in some cases may even include a plurality of physical devices (e.g., a computer station and connected peripherals), without departing from the scope of this disclosure. However, the implementation of system 10 within a single device should be distinguished from systems that utilize components that are stored and/or executed remotely from the single device along with components that are stored and/or executed locally on the single device.

As should be apparent, by providing system 10 within a single device, system 10 may enable a demonstration of application module 12 with respect to the manipulation of information in an information source and/or other aspects of system 10 without relying on resources that are remote from the single device. This may enable the demonstration to be given without accessing external resources that may require, for example, a communications link (e.g., over a network) with the single device, an excessive amount of external storage, and/or other possible requirements. Nevertheless, system 10 may enable a relatively full-scale demonstration of the functionality of application module 12 with respect to the manipulation of information within an information source and/or other aspects of system 10.

In some instances, the user may interact with system 10 via a user interface 20. User interface 20 may enable the user to provide input to, and receive output from, system 10. For example, in some implementations, user interface 20 may include a Graphical User Interface ("GUI") provided by system 10. User interface 20 may enable the user to input requests to system 10 to access and/or manipulate information within an information source (e.g., external information source 18). User interface 20 may convey to the user the response of an information source (e.g., external information source 18, etc.) to requests that have been input requesting access to and/or manipulation of information within the information source. In implementations of user interface 20 including a GUI, user interface 20 may be generated and/or managed by application module 12.

Application module 12 may be configured to (i) receive requests input by the user (e.g., via user interface 20) to access and/or manipulate information within external information source 18, (ii) generate requests for external information source 18 that request that external information source 18 provide access to information and/or manipulate information within external information source 18 in accordance with the requests input by the user, and (iii) convey, to the user, responses of external information source 18 to the requests generated by application module 12. In other words, application module 12 enables the user to interact with information within external information source 18. For example, the user may organize information, edit information, delete information, add information, view information, and/or interact with information within external information source 18 in other ways via application module 12. As was mentioned above, in some instances, application module 12 may generate and/or manage a GUI provided to the user via user interface 20 to enable the user to interact with information within external information source 18.

External information source 18 may generate, store, organize, and/or manipulate a set of information included therein. External information source 18 may include one or more applications (illustrated in FIG. 1 and referred to herein as application 22), information storage 24, external registry module 26, and/or other components. External information source 18 may be located remotely from system 10 (e.g., externally from the single device), and may communicate with system 10 via an operative communication link. The operative communication link may include a wireless link, a wired link, a network link, and/or other communication links.

Application 22 and/or information storage 24 may be configured to work in cooperation with each other to provide a source of information (e.g. files, documents, objects, data streams, etc.). For example, in some implementations, application 22 and/or information storage 24 may provide a database including entries that contain information. The information within the entries may be organized within the database based on their respective relationships. For instance, the database may include a relational database, an object oriented database, a hierarchical database, and/or other databases. As another example, application 22 and/or information storage 24 may provide a file system including files that contain information. As yet another example, application 22 and/or information storage 24 may provide a system registry including entries that contain information. Other examples exist.

External registry module 26 may include a set (or sets) of configuration registry values for external information source 18. For example, a set of configuration registry values for a database provided by application 22 and/or information storage 24 may be provided by external registry module 26. External registry module 26 may provide some or all of the configuration registry values to system 10 to enable communication between system 10 and external information source 18.

Local information source 16 may generate, store, organize, and/or manipulate a set of information included therein. Local information source 16 may include one or more applications (illustrated in FIG. 1 and referred to herein as application 28), information storage 30, local registry module 32, and/or other components. In some embodiments, local information source 16 may include a scaled down version of external information source 18. As such, the organization and/or the type of information provided by local information source 16 may be similar to the organization and/or the type of information provided by external information source 18, while the information provided by local information source 16 may be limited relative to the information provided by external information source 18. For example, in instances in which external information source 18 includes a database, local information source 16 may include a spread sheet that mimics one or more aspects of an organizational scheme of the database. In other examples, local information source may include eXtensible Markup Language ("XML") files, comma separated value files, and/or other files that can be organized in a manner that mimics one or more aspects an organizational scheme of an external information source for organizing information therein. The information provided by local information source 16 may be limited relative to information provided by external information source 18 in terms of quantity, complexity, detail, organization, sophistication, and/or otherwise limited.

The similarities between the organization and/or the type of information provided by local information source 16 and the organization and/or the type of information provided by external information source 18 may enable application module 12 to interact with local information source 16 in a manner similar to the interaction between application module 12 and external information source 18. The limited nature of the information within local information source 16 in comparison with the information within external information source 18 may enable inclusion of local information source 16 within system 10 (on the single device) where the amount, detail, organization, sophistication, etc. of the information within external information source 18 would make inclusion of external information source 18 within system 10 (on the single device) impracticable.

Local registry module 32 may include a set (or sets) of configuration registry values for local information source 16. The set (or sets) of configuration registry values may include dummy values since, as has been discussed above, local information source 16 may not correspond exactly with external information source 18. The dummy, or demonstration, values stored in the set (or sets) of configuration registry values may be assembled such that application module 12 "sees" the configuration registry values of external information source 18. For instance, the set (or sets) of configuration registry values may be provided by local registry module 32 in one or more XML files. The values included in the XML files may include configuration registry values for an information similar to external information source 18.

Interface module 14 may be configured to format requests generated by application module 12 into a format that is understandable by an information source (e.g., external information source 18, local information source 16, etc.), and to format the responses of the information source to the requests in a format that is understandable to application module 12, thereby enabling interaction between the information source and application module 12. In some instances, interface module 14 may include an external interface sub-module 34 and/or an local interface sub-module 36.

External interface sub-module 34 may be configured to enable interaction between application module 12 and external information source 18. As such, external interface sub-module 34 may format requests generated by application module 12 to external information source 18 to provide access to and/or manipulate information within external information source 18 into a format that is understandable to external information source 18. Further, external interface sub-module 34 may format responses generated by external information source 18 in response to the requests into a format that is understandable to application module 12. This may enable application module 12 to convey the responses of external information source 18 to the user (e.g., via user interface 20). In order to facilitate communication between external information source 18 and application module 12, external interface sub-module 34 may retrieve configuration registry values from external registry module 26.

Local interface sub-module 36 may be configured to enable application module 12 to interact with local information source 16 in a manner that is substantially the same as the manner in which application module 12 interacts with external information source 18. In other words, local interface sub-module 36 may enable application module 12 to access and/or manipulate information within local information source 16 using the same requests as application module 12 uses to access and/or manipulate information within external information source 18. This may enable system 10 to provide a demonstration of the functionality of application module 12 with respect to an information source without accessing external information source 18.

In order to enable application module 12 to interact with local information source 16, local interface sub-module 36 may format requests generated by application module 12 to local information source 16 to provide access to and/or manipulate information within local information source 16 into a format that is understandable to local information source 16. Further, local interface sub-module 36 may format responses generated by local information source 16 in response to the requests into a format that is understandable to application module 12. This may enable application module 12 to convey the responses of local information source 16 to the user (e.g., via user interface 20). In order to facilitate communication between local information source 16 and application module 12, local interface sub-module 36 may retrieve configuration registry values from local registry module 32.

It should be appreciated, that in some instances system 10 may provide a self-contained demonstration of application module 12 without including external interface sub-module 34, as communication with external information source 18 is not required to provide the demonstration. However, in some implementations, interface module 14 may include both sub-modules 34 and 36 without substantially impacting the effectiveness and/or efficiency of the demonstration of application module 12. In these implementations, sub-modules 34 and 36 may be provided by interface module 14 without regard to whether interface module 14 will be used to enable interaction between application module 12 and external information source 18 (e.g., in an actual implementation of application module 12) or between application module 12 and local information source 16 (e.g., in a demonstration of application module 12 on internal information source 16).

In some embodiments of the invention, electronically readable media may be placed in communication with the single device to effect the installation of the components of system 10 thereon. The electronically readable media may include magnetic media (e.g., a hard drive, a diskette, a tape, etc.), optical media (e.g., an optical disk, etc.), solid-state storage media (e.g., a flash drive etc.), and/or other electronically readable media. The electronically readable media may be placed in communication with the single device via a peripheral memory reader associated with the single device (e.g., a removable disk drive, a communication port that accepts memory devices (e.g., a USB port), etc.). In some other implementations, the electronically readable media may be placed in communication with the single device via a connection between the single device and another device (e.g., over a network, etc.). The electronically readable media may include machine readable code the effects the installation of the components of system 10 on the single device so that the single device is capable of providing a demonstration of application module 12 without accessing additional outside resources.

It should be appreciated that as system 10 performs a demonstration of application module 12 by enabling application module 12 to interact with information included within local information source 16, the information included within information source 16 may become altered. In some cases, it may be desirable to return the information to a previous state, or even an initial state (e.g., the state of the information when local information source 16 was first installed on the single device). For example, the information may be returned to its initial state to restart the demonstration, or to begin a new demonstration. In these cases, electronically readable media may be placed in communication with the single device to effect the resetting of the information within local information source 16. In some instances, the electronically readable media that resets the information within local information source 16 may include the electronically readable media used to install system 10.

Figure 2:
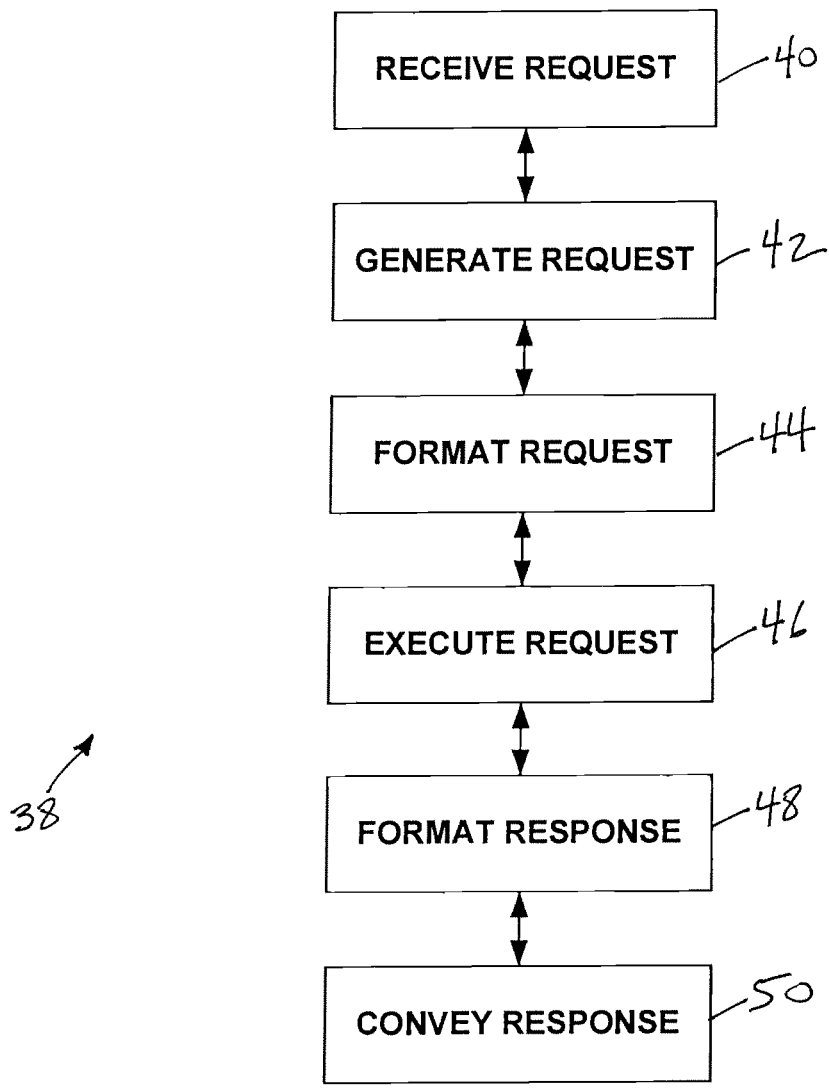
FIG. 2 illustrates a method of providing a self-contained demonstration, in accordance with one or more embodiments of the invention.

FIG. 2 illustrates a method 38 of providing a self-contained demonstration on a single device, according to one or more embodiments of the invention. It should be appreciated that although specific reference is made below regarding various operations of method 38 that can be executed by components of system 10 (e.g., illustrated in FIG. 1 and described above), this is for illustrative purposes. In other embodiments, systems other than system 10 may be implemented to execute some or all of the operations of method 38.

In some implementations, method 38 may include an operation 40 at which a request is received from a user to access and or manipulate information within an information source. In some embodiments, operation 40 may include receiving a request input by the user via a user interface similar to user interface 20 (shown in FIG. 1 and discussed above).

At an operation 42 a request may be generated that is intended for an external information source. The request generated at operation 42 may request that the external information source provide access to, and/or manipulate, information within the external information source in accordance with the request received from the user at operation 40. The external information source may include an information source that is located remotely from the single device. In some embodiments of the invention, operation 42 may be executed by an application module similar to application module 12 (shown in FIG. 1 and discussed above).

At an operation 44 the request generated at operation 42 may be formatted into a format that is understandable by a local information source. The local information source may be located locally on the single device, and may be a scaled down version of the external information source. For instance, the local information source may provide information that is similar to the organization and/or the type of information provided by the external information source and the information provided by the local information source may be limited relative to the information provided by the external information source. In some embodiments of the invention, operation 44 may be performed by an interface module similar to interface module 14 (shown in FIG. 1 and discussed above). In some of these embodiments, operation 44 may be performed by a local interface sub-module similar to local interface sub-module 36 (shown in FIG. 1 and discussed above).

At an operation 46 the request formatted at operation 44 may be executed on the information in the local information source to generate a response to the formatted request. In some embodiments of the invention, operation 46 may be performed by local information source similar to local information source 16 (shown in FIG. 1 and discussed above).

At an operation 48 the response generated at operation 46 may be formatted into a format that is understandable to the application module. The response may further be formatted to mimic a response of an external information source to the request generated at operation 42. In some embodiments of the invention, operation 48 may be performed by an interface module similar to interface module 14 (shown in FIG. 1 and discussed above). In some of these embodiments, operation 48 may be performed by a local interface sub-module similar to local interface sub-module 36 (shown in FIG. 1 and discussed above).

At an operation 50 the response formatted at operation 48 may be conveyed to the user. In some embodiments of the invention, operation 50 may be performed by an application module similar to application module 12 (shown in FIG. 1 and described above). In some of these embodiments, the application module may convey the response to the user via a user interface similar to user interface 20 (shown in FIG. 1 and described above).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A self-contained demonstration system, wherein the components of the self-contained demonstration system are installed and executed on a single device, the system comprising:
   an electronic display that is associated with the single device and that displays a graphical user interface configured to receive input from users and provide output to users; and
   a processor associated with the single device, the processor configured to execute computer program modules, the computer program modules comprising:
      an application module configured (i) to receive, via the graphical user interface associated with the single device, user requests to access and/or manipulate information within an external database server hosting an external database, (ii) to generate requests for the external database server that request the external database server to provide access to the information within the external database and/or manipulate the information within the external database in accordance with the requests received from the user through the graphical user interface, and (iii) to convey, to the user through the graphical user interface, responses of the external database server to the requests generated by the application module,
      wherein the external database server is logically and physically separate and discrete from the self-contained demonstration system and the single device, and is located remotely from the single device;
      an interface module configured to format the requests generated by the application module into a format that is understandable to the external database server, and to format the response of the external database server to the requests into a format that is understandable to the application module, thereby enabling interaction between the application module and the external database server; and
      a local information source that is located locally on the single device, the local information source being a scaled down version of the external database such that the organization and/or a type of information provided by the local information source is similar to the organization and/or a type of information included in the external database and the information provided by the local information source is limited relative to the information included in the external database,
      wherein the interface module is further configured to format requests generated by the application module and responses of the local information source to the requests such that the application module and the local information source are enabled to interact in substantially the same manner as the application module would interact with the external database server, thereby providing the user with a self-contained demonstration of the operation of the application module with the external database server embodied in the single device.

2. The system of claim 1, wherein the local information source comprises a spreadsheet that is a scaled down version of the external database.

3. The system of claim 1, wherein interface module and the local information source are configured such that the information within the local information source is altered by the local information source as the local information source manipulates the information in accordance with the requests generated by the application module.

4. The system of claim of claim 1, wherein the interface module is further configured to interact with an external registry module associated with the external database server and located remotely from the single device, the external registry module storing a configuration setting of the external database server, and the interaction between the interface module and the external registry module comprising retrieving the configuration setting of the external database server from the external registry module by the interface module.

5. The system of claim 4, further comprising a local registry module associated with the local information source and located locally on the single device, the local registry module storing a configuration setting of the local information source, and wherein the interface module is further configured to retrieve the configuration setting of the local information source from the local registry module.

6. The system of claim 5, wherein the local registry module stores an extensible markup language file that contains the configuration setting of the local information source.

7. An electronically readable medium that is non-transient, and includes machine readable code, wherein the machine readable code is designed to execute installation of a self-contained demonstration system on a single device, the electronically readable medium comprising:
   application code that effects the installation of an application module on the single device, the application module being configured (i) to receive, from a user through a graphical user interface device presented to the user on an electronic display associated with the single device, requests input by the user to access and/or manipulate information within an external database server hosting an external database, (ii) to generate requests for the external database server that request the external database server to provide access to the information within the external database and/or manipulate the information within the external database in accordance with the requests input by the user, and (iii) to convey, to the user through the graphical user interface associated with the single device, responses of the external database server to the requests generated by the application module,
   wherein the external database server is logically and physically separate and discrete from the self-contained demonstration system and the single device, and is located remotely from the single device;
   interface code that effects the installation of an interface module on the single device, the interface module being configured to format the requests generated by the application module into a format that is understandable to the external database server, and to format the responses of the external database server to the requests into a format that is understandable to the application module, thereby enabling interaction between the application module and the external database server; and
   local information source code that effects the installation of a local information source code on the single device, the local information source being a scaled down version of the external database such that the organization and/or a type of information provided by the local information source is similar to the organization and/or a type of information included in the external database and the information provided by the local information source is limited relative to the information included in the external database, wherein, upon installation, the interface module is further configured to format requests generated by the application module and responses of the local information source to the requests such that the application module and the local information source are enabled to interact in substantially the same manner as the application module would interact with the external database server, thereby providing the user with a self-contained demonstration of the operation of the application module and the external database server embodied in the single device.

8. The electronically readable medium of claim 7, wherein the local information source comprises a spreadsheet that is a scaled down version of the external database.

9. The electronically readable medium of claim 7, wherein the information within the local information source is altered as the information within the local information source is manipulated in accordance with the requests generated by the application module.

10. The electronically readable medium of claim 9, further comprising information resetting code that effects a resetting of the information within the local information source subsequent to the alteration of the information within the local information source.

11. The electronically readable medium of claim 7, wherein the interface module is further configured to interact with an external registry module associated with the external database server and located remotely from the single device, the external registry module storing a configuration setting of the external database server, and the interaction between the interface module and the external registry module comprising retrieving the configuration setting of the external database server from the external registry module by the interface module.

12. The electronically readable medium of claim 11, further comprising local registry code that effects the installation of a local registry module on the single device, the local registry module being associated with the local information source, the local registry module storing a configuration setting of the local information source, wherein the interface module is further configured to retrieve the configuration setting of the local information source from the local registry module.

13. The electronically readable medium of claim 12, wherein the local registry module stores an extensible markup language file that contains the configuration setting of the local information source.

14. A computer-implemented method of providing a self-contained demonstration on a single device associated with an electronic display that presents a graphical user interface, and having a processor configured to execute one or more computer program modules, the method comprising:

receiving from a user, via the graphical user interface associated with the single device, a request to access and/or manipulate information;

executing, on the one or more processors of the single device, one or more computer program modules configured to generate a request intended for an external database server hosting an external database to provide access to information within the external database and/or manipulate information within the external database in accordance with the request received from the user, wherein the external database server is logically and physically separate and discrete from the self-contained demonstration system and the single device, and is located remotely from the single device;

executing, on the one or more processors of the single device, one or more computer program modules configured to format the request intended for the external database server into a format that is understandable by a local information source that is located locally on the single device, the local information source being a scaled down version of the external database such that the organization and/or a type of the information provided by the local information source is structurally similar to the organization and/or a type of the information included in the external database and the information provided by the local information source is limited relative to the information included in the external database; and executing, on the one or more processors of the single device, one or more computer program modules configured to execute the request intended for the external database server on the information within the local information source to generate a response to the request.

15. The method of claim 14, further comprising conveying the response to the user on the graphical user interface of the single device.

16. The method of claim 14, wherein the local information source comprises a spreadsheet that is a scaled down version of the external database.

17. The method of claim 14, wherein the information within the local information source is altered during the execution of the request intended for the external information.

18. The method of claim 17, further comprising executing, on the processor of the computer system, a computer program module configured to reset the information within the local information source subsequent to the alteration of the information within the local information source.

19. The system of claim 1, wherein the local information source is further configured to reset the information within the local information source subsequent to the alteration of the information within the local information source.

20. The electronically readable medium of claim 7, wherein the local information source code is further configured to reset the information within the local information source code subsequent to the alteration of the information within the local information source code.

* * * * *